United States Patent
Hustava et al.

(10) Patent No.: US 10,523,461 B2
(45) Date of Patent: Dec. 31, 2019

(54) LIN-COMPATIBLE FAST-DATA BUS

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 9 days.

(21) Appl. No.: 16/005,031

(22) Filed: Jun. 11, 2018

(65) Prior Publication Data
US 2019/0158310 A1 May 23, 2019

Related U.S. Application Data

(60) Provisional application No. 62/588,737, filed on Nov. 20, 2017.

(51) Int. Cl.
*H04L 12/40* (2006.01)
*H04L 25/03* (2006.01)

(52) U.S. Cl.
CPC .... *H04L 12/4013* (2013.01); *H04L 12/40019* (2013.01); *H04L 25/03834* (2013.01); *H04L 2012/40234* (2013.01); *H04L 2012/40273* (2013.01)

(58) Field of Classification Search
CPC ........... H04L 12/4013; H04L 12/40019; H04L 25/03834; H04L 2012/40234; H04L 2012/40273
See application file for complete search history.

(56) References Cited

U.S. PATENT DOCUMENTS

| | | | |
|---|---|---|---|
| 2006/0039504 A1* | 2/2006 | Sicard | H04L 25/0292 375/317 |
| 2007/0208470 A1* | 9/2007 | Itabashi | H04L 12/4135 701/36 |
| 2016/0221416 A1* | 8/2016 | Jiang | F25B 49/02 |

OTHER PUBLICATIONS

DSI, DSI3 Bus Standard, Revision 1.00, Feb. 16, 2011, 45 pages.
LIN, "Specification Package," Revision 2.1, Nov. 24, 2006, 209 pages.
Maxim Integrated, "MAX14830," 19-5547, Rev. 7, Feb. 2016, 68 pages.
ON Semiconductor, "NCV7424, Four Channel LIN Transceiver," Rev. 2, May 2015, 12 pages.
AB Elektronik et al., PSI5, Peripheral Sensor Interface for Automotive Applications, Technical Specification V2.2, Aug. 2016, 65 pages.

* cited by examiner

*Primary Examiner* — Jianye Wu
(74) *Attorney, Agent, or Firm* — Ramey & Schwalter, LLP; Daniel J. Krueger

(57) ABSTRACT

Methods and transceivers are provided for enabling fast-data messages on a local interconnect network (LIN) compatible bus. One illustrative slave transceiver embodiment includes: a comparator and a digital-to-analog converter (DAC). The comparator detects amplitude modulation of a bias voltage at a first baud rate on a serial bus line to receive a first LIN frame header having a frame identifier for a fast-data frame. The DAC responsively drives a fast-data response message having an expanded payload and/or a higher baud rate on the serial bus line.

20 Claims, 6 Drawing Sheets

FIG. 6A
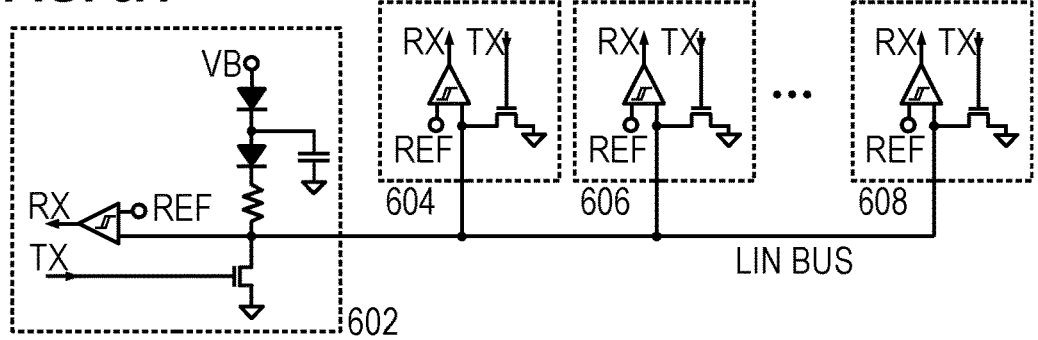
FIG. 6B
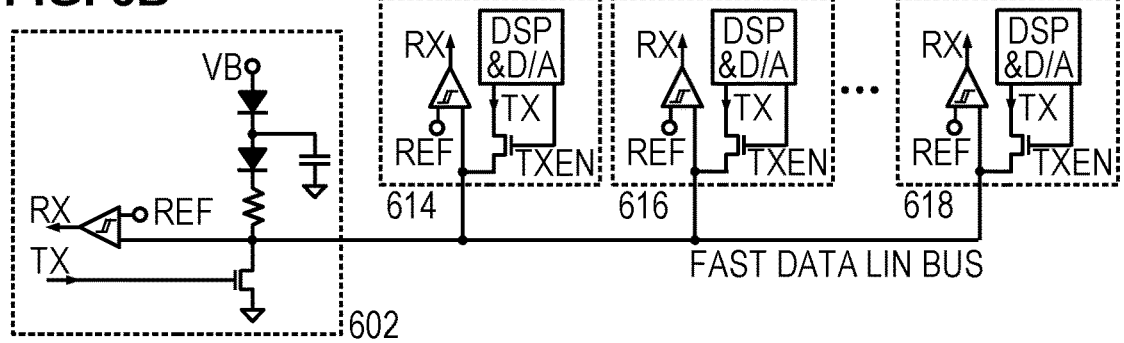
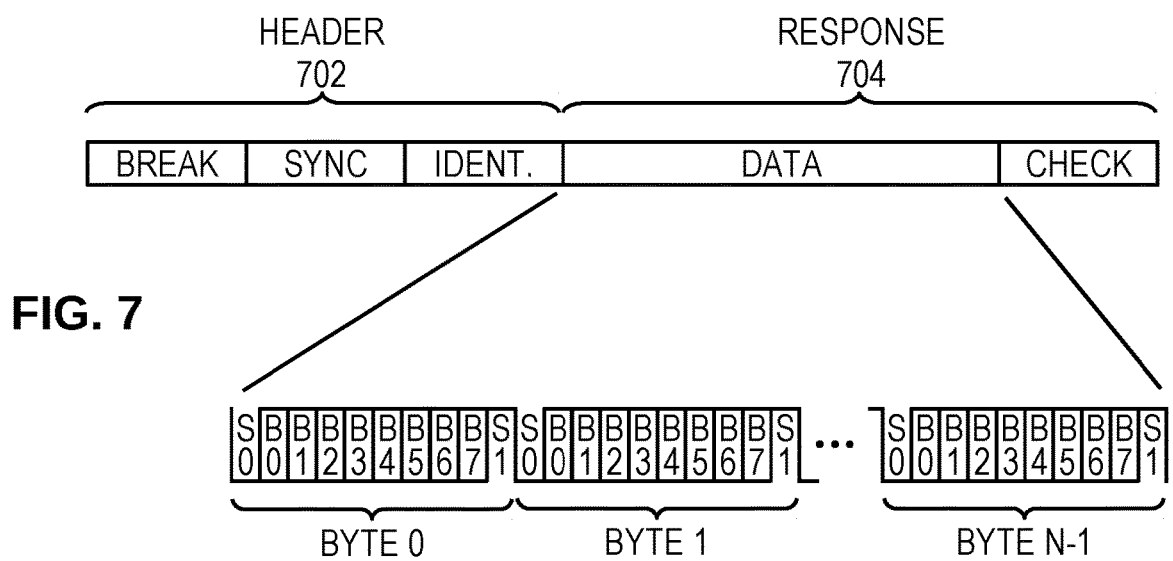
FIG. 7

LIN-COMPATIBLE FAST-DATA BUS

CROSS-REFERENCE TO RELATED APPLICATIONS

The present application claims priority to Provisional U.S. application No. 62/588,737, titled "Communication for park assist sensors in ADAS systems" and filed 2017 Nov. 20 by inventors Marek Hustava and Tomas Suchy. This provisional application is hereby incorporated herein by reference.

BACKGROUND

Modern automobiles are equipped with an impressive number and variety of sensors. For example, cars are now routinely equipped with arrays of ultrasonic sensors to monitor the distance between the car and any nearby persons, pets, vehicles, or obstacles. Due to environmental "noise" and safety concerns, each of the sensors may be asked to provide tens of measurements each second while the car is in motion. As the car industry moves towards the production of autonomous vehicles, the number of sensors (and sensor measurement rate) is expected to increase substantially, placing an ever-growing burden on the communications buses conveying sensor measurements to the electronic control unit (ECU) and/or other processing modules responsible for converting the measurements into situational information and control decisions. The communications burden may be exacerbated by the desire of many manufacturer for "sensor fusion", which requires communication of relatively raw measurement information to a central processing unit in a fashion that enables the processing unit to combine measurements from multiple sensors. Such combining can enable novel, improved, and/or more robust measurements to be obtained via, e.g., triangulation, inversion, and multi-modal acquisition.

When designing to accommodate increased communications burdens, certain countervailing considerations come into play. Reliability is preferably maximized while minimizing costs of materials, minimizing complexity, minimizing electromagnetic interference (EMI). Thus, for example, it is undesirable to add additional bus conductors or to raise the spectral energy content of signals where that might increase electromagnetic emissions and susceptibility to interference.

SUMMARY

Accordingly, there are disclosed herein various methods and transceivers suitable for providing fast-data messages on a local interconnect network (LIN) compatible bus. One illustrative method embodiment for a slave transceiver includes: (a) receiving a first LIN frame header at a first baud rate on a serial bus line, the first LIN frame header having a frame identifier for a fast-data frame; and (b) sending a fast-data response message at a second baud rate on the serial bus line, the second baud rate being larger than the first baud rate.

One illustrative method embodiment for a master transceiver includes: (a) sending a first LIN frame header at a first baud rate on a serial bus line, the first LIN frame header having a frame identifier for a fast-data frame; and (b) receiving a fast-data response message at a second baud rate on the serial bus line, the second baud rate being larger than the first baud rate.

One illustrative slave transceiver embodiment includes: a comparator and a digital-to-analog converter (DAC). The comparator detects amplitude modulation of a bias voltage at a first baud rate on a serial bus line to receive a first LIN frame header having a frame identifier for a fast-data frame. The DAC responsively drives a fast-data response message having an expanded payload and/or a second baud rate on the serial bus line, the expanded payload having more than 8 bytes and the second baud rate being larger than the first baud rate.

Each of the foregoing embodiments may be employed individually or conjointly, and they may further employ one or more of the following optional features in any suitable combination: 1. (c) receiving a second LIN frame header on the serial bus line, the second LIN frame header having a frame identifier for a standard LIN frame; and (d) responsively sending a standard LIN response message at the first baud rate on the serial bus line, the standard LIN response message having at most eight data bytes and a one-byte checksum. 2. the fast-data response message has more than eight data bytes. 3. each data byte of the fast-data response message and of the standard LIN response message is preceded by a start bit and followed by a stop bit. 4. the fast-data response message has at least twenty data bytes. 5. said sending includes using pulse shaping to limit spectral energy above the second baud rate. 6. the pulse shaping uses a sinusoidal pulse, Gaussian pulse, sinc pulse, or other suitable pulse shape. 7. the first LIN frame header has a characteristic spectrum that, at any frequency above the second baud rate, exceeds or approximately equals the spectral energy of the fast-data response message. 8. the first baud rate is 20 kHz and the second baud rate is 40 kHz. 9. said sending includes setting a universal asynchronous receiver/transmitter (UART) to the first baud rate. 10. said receiving includes setting the UART to the second baud rate. 11. (c) sending a second LIN frame header on the serial bus line, the second LIN frame header having a frame identifier for a standard LIN frame; and (d) receiving a standard LIN response message at the first baud rate on the serial bus line, the standard LIN response message having at most eight data bytes and a one-byte checksum. 12. the comparator receives a second LIN frame header on the serial bus line, the second LIN frame header having a frame identifier for a standard LIN frame. 13. the DAC responsively drives a standard LIN response message at the first baud rate on the serial bus line, the standard LIN response message having at most eight data bytes and a one-byte checksum. 14. the DAC applies pulse shaping to bits of the fast-data response message to limit spectral energy above the second baud rate.

BRIEF DESCRIPTION OF THE DRAWINGS

In the drawings:

FIG. 6A is a schematic of illustrative LIN bus compliant master and slave interfaces.

FIG. 6B is a schematic of illustrative fast-data LIN bus master and slave interfaces.

FIG. 7 is a diagram of an illustrative frame format adapted for LIN compliant fast-data communications.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
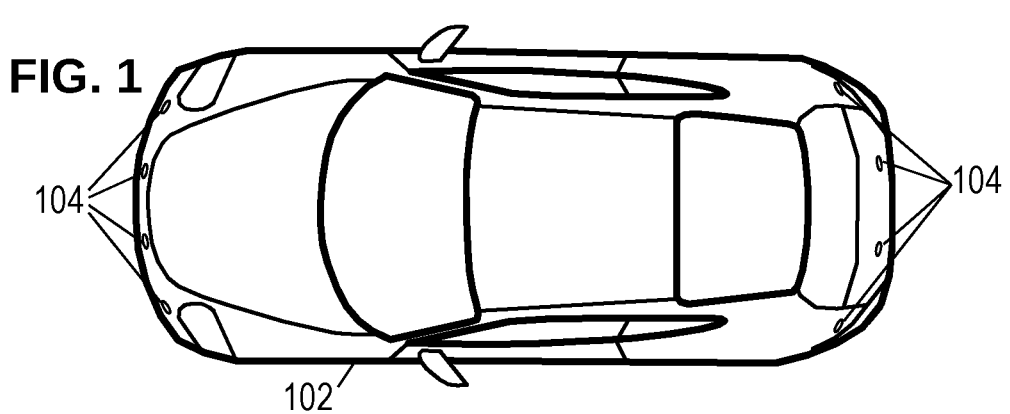
FIG. 1 is an overhead view of an illustrative vehicle equipped with ultrasonic sensors.

FIG. 1 shows an illustrative vehicle 102 equipped with a set of ultrasonic sensors 104 for advanced driver assistance. The number and configuration of sensors in the sensor arrangement varies, and it would not be unusual to have eight sensors on each bumper with six additional sensors on each side for zone monitoring. The vehicle may employ the sensor arrangement for detecting and measuring distances to objections in the various detection zones, using the sensors for individual measurements as well as cooperative (e.g., triangulation) measurements.

The ultrasonic sensors are transceivers, meaning that each sensor can transmit and receive pulses of ultrasonic sound. Emitted pulses propagate outward from the vehicle until they encounter and reflect from an object or some other form of acoustic impedance mismatch. The reflected pulses return to the vehicle as "echoes" of the emitted pulses. The times between the emitted pulses and received echoes (aka "times of flight") are indicative of the distances to the reflection points. In some implementations only one sensor transmits at a time, though all of the sensors may be configured to measure the resulting echoes. In other implementations, multiple sensors transmit concurrently, relying on different frequencies or waveforms to distinguish the echoes from different sources.

Figure 2:
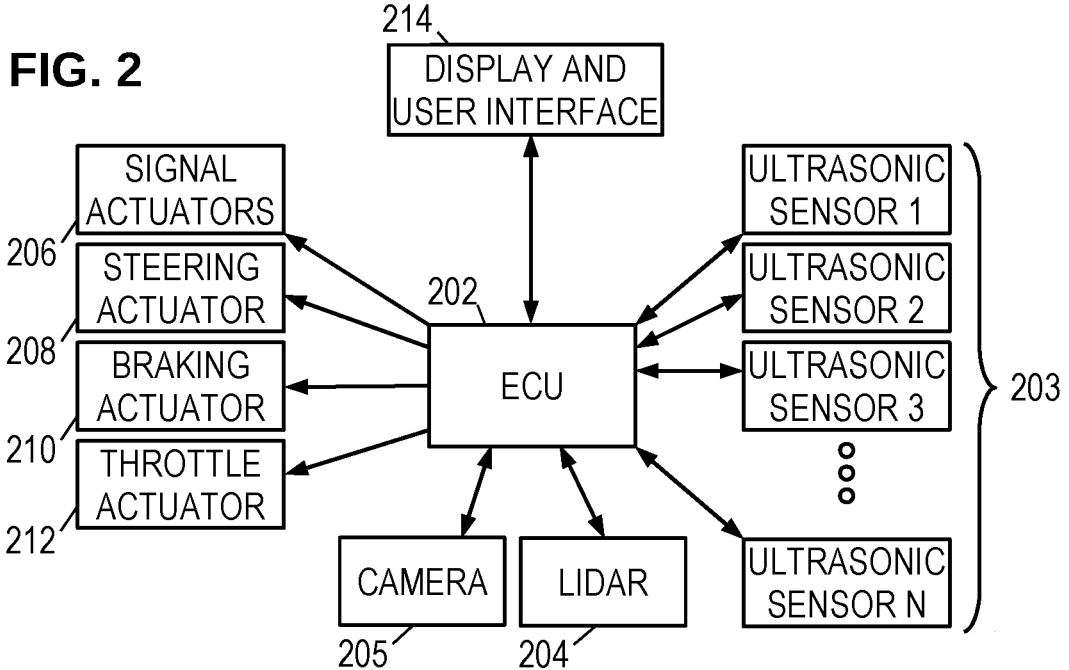
FIG. 2 is a block diagram of an illustrative advanced driver-assistance system.

FIG. 2 shows an electronic control unit (ECU) 202 coupled to various sensors including a set of ultrasonic sensors 203, a LIDAR (light detection and ranging) unit 204, and a camera 205, via point-to-point links forming a star topology. To provide automated driver assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features. Other bus topologies are also suitable, as discussed below.

Figure 3:
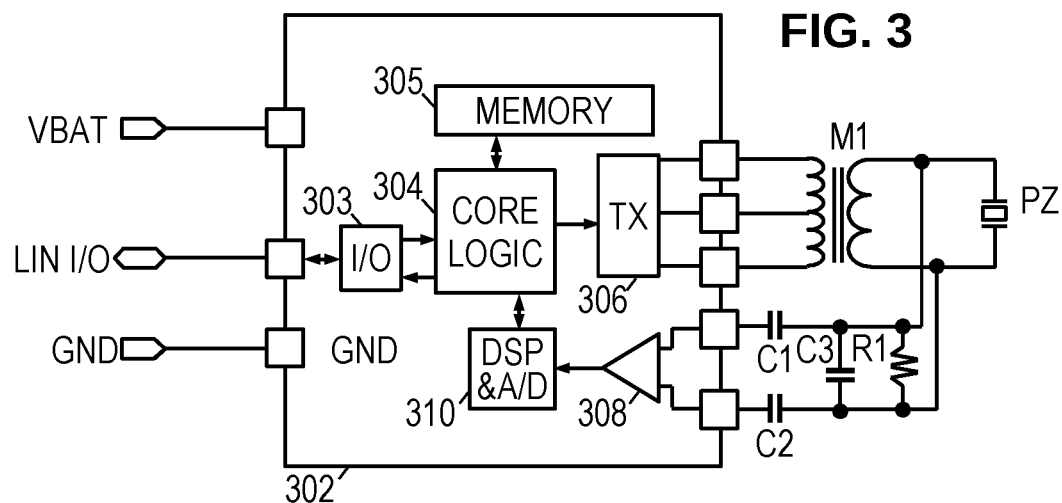
FIG. 3 is a circuit schematic of an illustrative ultrasonic sensor.

As indicated in FIG. 3, besides the two power terminals (Vbat and GND), each of the illustrative ultrasonic sensors is only connected to the ECU 202 by a single input/output ("I/O" or "IO") line of a local interconnect network ("LIN") bus. The sensor controller 302 includes an I/O interface 303 that monitors the I/O line for LIN frame headers to which it should respond. When a LIN frame header with the appropriate frame identifier (ID) is received, the I/O interface 303 sends a response message to convey the sensor measurements or other desired information. The ECU 202 may provide register settings and/or initiate acquisition of the sensor measurements by supplying a suitable frame header followed by a self-generated response message.

The sensor controller 302 includes a core logic 304 that operates in accordance with firmware and parameters stored in nonvolatile memory 305 to parse commands from the ECU and carry out the appropriate operations, including the transmission and reception of ultrasonic pulses. To transmit an ultrasonic pulse, the core logic 304 is coupled to a transmitter 306 which drives a pair of transmit terminals on the sensor controller 302. The transmitter terminals are coupled via a transformer M1 to a piezoelectric transducer PZ. The transformer M1 steps up the voltage from the sensor controller (e.g., 12 volts) to a suitable level for driving the piezoelectric transducer (e.g., 48 volts). The piezoelectric transducer PZ has a resonance frequency that is tuned to a desirable value (e.g., 48 kHz) with a parallel capacitor C3 and a resonance quality factor (Q) that is tuned with a parallel resistor R1.

A pair of DC-isolation capacitors C1, C2 couple the piezoelectric transducer to the sensor controller's pair of receive terminals to protect against high voltages. Further protection is provided with internal voltage clamps on the receive terminals. Such protection is needed for the intervals when the piezoelectric transducer is transmitting. However, the received echo signals are typically in the millivolt or microvolt range, and accordingly, a low-noise amplifier 308 amplifies the signal from the receive terminals. The amplified receive signal is digitized and processed by a digital signal processor (DSP) 310 with an integrated analog-to-digital converter (ADC).

DSP 310 applies programmable methods to measure the actuation period of the transducer during the transmission of a pulse (including the ensuing reverberation or "ringing" period), and to detect and measure the magnitudes and arrival times of any received pulses or "echoes". Such methods may employ correlation, matched or bandpass filtering, threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and decay rate, and may further detect error conditions such as an excessively short or long actuation period, under-voltage or over-voltage, thermal shutdown, etc. Any error conditions may be noted and stored in internal registers or nonvolatile memory 305.

Figure 4:
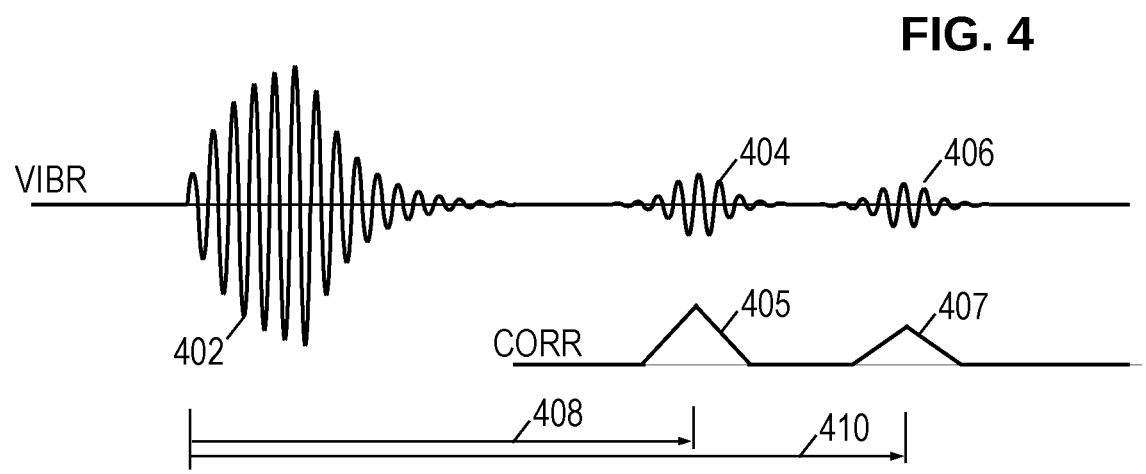
FIG. 4 is a diagram of an illustrative time-of-flight measurement.

FIG. 4 shows an illustrative sensor measurement, which begins with the transmission of an ultrasonic pulse 402 from the piezoelectric transducer. During the transmission, the receive electronics may be voltage-clamped or otherwise protected from the piezoelectric transducer voltage. Once the residual vibration of the transducer has decayed to a low level, the receive electronics can detect reflections of the pulse as echoes 404, 406 (not shown to scale). The receive electronics may include a correlator or filter operating on the receive voltage to detect an envelope of the echoes (signal CORR in FIG. 4). Thus envelope 405 corresponds to echo 404 and envelope 407 corresponds to echo 406. The echo arrival times 408, 410 may be taken as the point where the envelope reaches a peak, as the point where the envelope crosses a threshold, or any other suitable measure. The time elapsed between the pulse transmission time and each echo arrival time represents the round-trip travel time of the ultrasonic pulse energy between the transducer and the reflector.

In some contemplated embodiments, each sensor measures, in response to each transmitted pulse, an arrival time and peak magnitude of up to N echoes for communication to the ECU. Contemplated values of N are in the range from 10 to 20, but other values may also be suitable. In other contemplated embodiments, each sensor samples the receive signal at approximately 50 microsecond intervals for about 50 milliseconds following each pulse (roughly 1000 samples) and communicates the digital sample data to the ECU for processing. Various existing signal compression techniques can be employed to minimize the number of bits required to communicate the digital sample data to the ECU.

Figure 5:
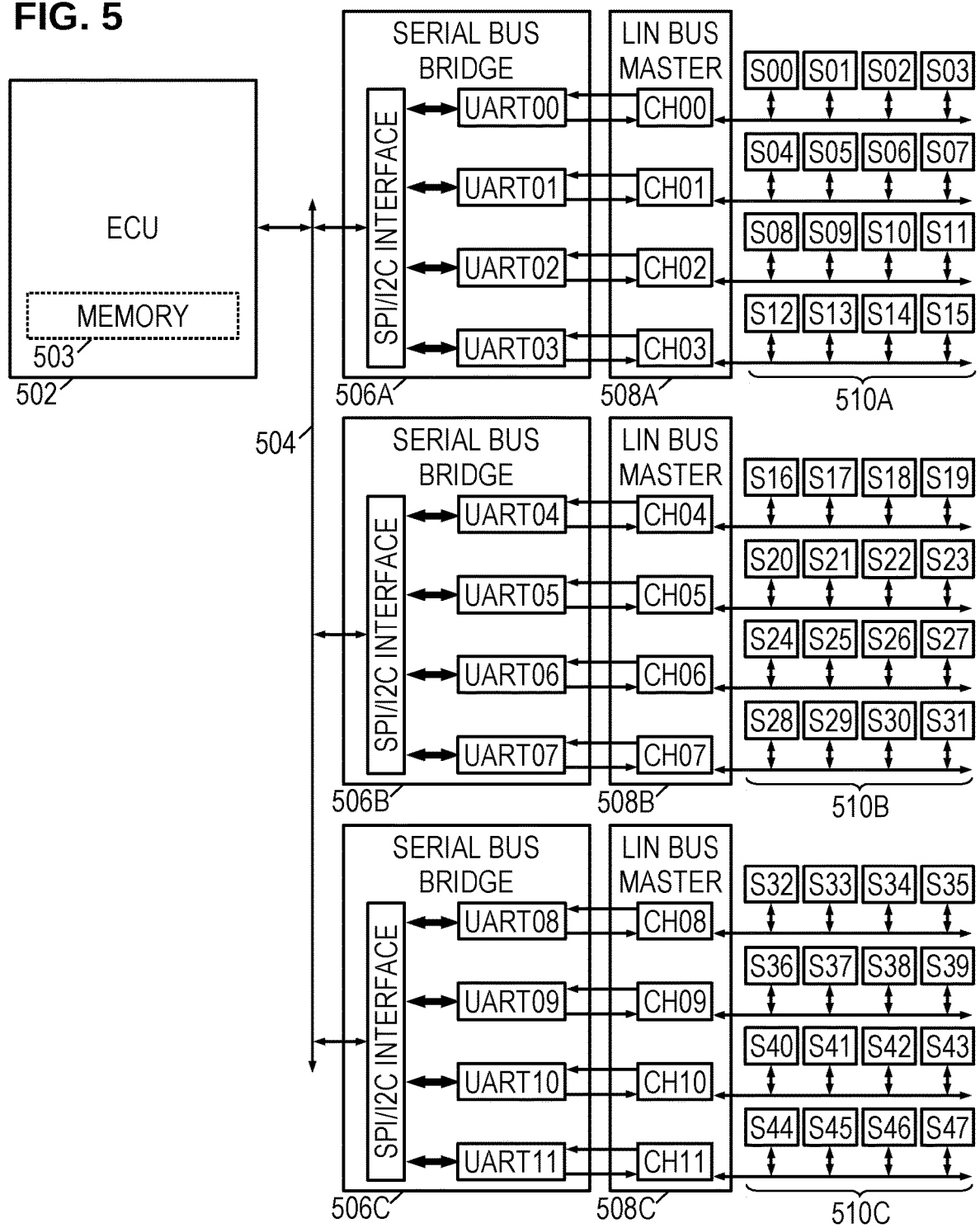
FIG. 5 is a block diagram of an illustrative sensor arrangement employing LIN bus communications.

FIG. 5 shows a sensor arrangement having a hierarchical topology. The ECU 502 is configured by firmware in an embedded system memory 503 to collect measurements from each of the sensors in the sensor array. The ECU 502 is coupled via an inter-integrated circuit (I2C) or serial peripheral interface (SPI) bus to one or more serial bus bridges 506A-506C. The bus bridges may be, e.g., a MAX14830 Quad Serial UART with FIFO chip from Maxim Integrated. The bus bridges can buffer transmit and receive data streams for each UART (universal asynchronous receiver transmitter). Each UART may be coupled to a corresponding LIN bus via a LIN transceiver, which may be implemented as part of, e.g., an NCV7424 Four Channel LIN Transceiver chip which provides LIN-compliant voltage translation and conversion between unidirectional transmit & receive and half-duplex bidirectional communications. The datasheets for these chips are hereby incorporated herein by reference. Transceiver chips 508A-508C each act as the LIN bus masters for four independent LIN buses, each bus having four sensors operating as LIN bus slave devices. Thus the three transceiver chips 508A-508C support communications with three sets 510A-510C of sixteen sensors each. Of course other bus arrangements may also be suitable.

FIG. 6A is a schematic of illustrative master and slave device transceivers for a LIN bus. The bus master transceiver 602 couples a supply voltage VB to the I/O line via a diode and a pull-up resistor. (A second diode and capacitor may be included to reduce the effects of power transients on the bus's operation). A transmit signal is applied to the gate of an n-channel MOSFET to couple the I/O line to ground when sending a "0" bit and to decouple the I/O line from ground when sending a "1" bit (or when listening for frame responses). Other suitably-biased transistors or switches can alternatively be employed.

Figure 8A:
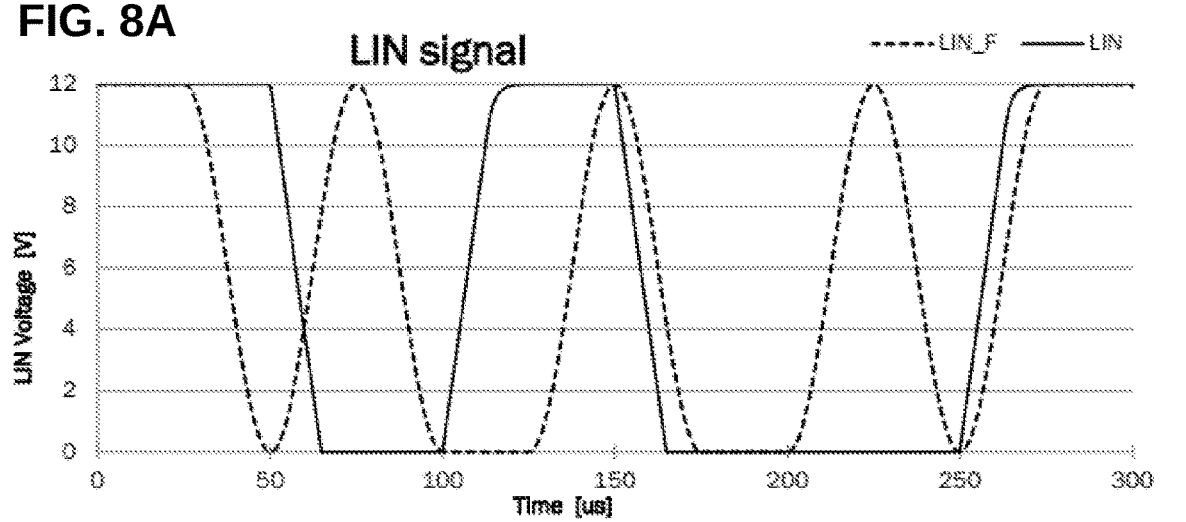
FIG. 8A is a graph comparing illustrative fast-data and conventional LIN signals.

When the I/O line is de-coupled from ground for listening, a comparator compares the I/O line voltage to a reference voltage to detect response message bits from the bus slave transceivers. Bus slave transceivers 604, 606, 608, can transmit and receive bits in a similar fashion. Referring momentarily to FIG. 8A, an illustrative I/O line voltage waveform is shown in solid line. The LIN standard provides for fast transitions and sharp corners. Even with specified limits for the voltage slew at a 20 kHz baud rate, the resulting signal spectrum may have significant signal energy above 40 kHz (see FIG. 8B). Note that any signal energy above about 45 kHz has the potential to interfere with the operation of piezoelectric transducers tuned to 48 kHz.

FIG. 6B is a schematic of illustrative transceivers for a novel fast-data LIN bus. The illustrated embodiment keeps the same bus master transceiver 602, as it is desirable to preserve compatibility with existing controllers and bus bridges, though perhaps requiring a firmware upgrade as discussed further below. The bus slave transceivers 614, 616, and 618, are modified to support higher baud rates and pulse shaping for their transmit signals. Rather than coupling and decoupling the I/O line to ground, the transistor of transceivers 614-618 couples and decouples the I/O line to the output of a digital-to-analog converter or another suitable driver for setting the voltage of the I/O line. The transistor decouples the I/O line to isolate the driver while listening, and connects the I/O line to the driver when transmitting.

With such a configuration, each of the bus slave transceivers can assert greater control over the I/O line when transmitting, enabling them to provide pulse shaping. Preferably, the transceivers provide sinusoidal pulse shaping, a technique in which each bit transition is represented by a peak-to-trough or trough-to-peak portion of a sinusoid (or a reasonable approximation thereof). The frequency of the sinusoid preferably matches the baud rate, such that an alternating zero-one-zero-one-zero . . . bit pattern produces a sinusoidal variation of the I/O line voltage. Similar results can be achieved with other pulse shaping techniques (e.g., Gaussian pulse, sinc pulse, or other suitable pulse waveforms).

Figure 8B:
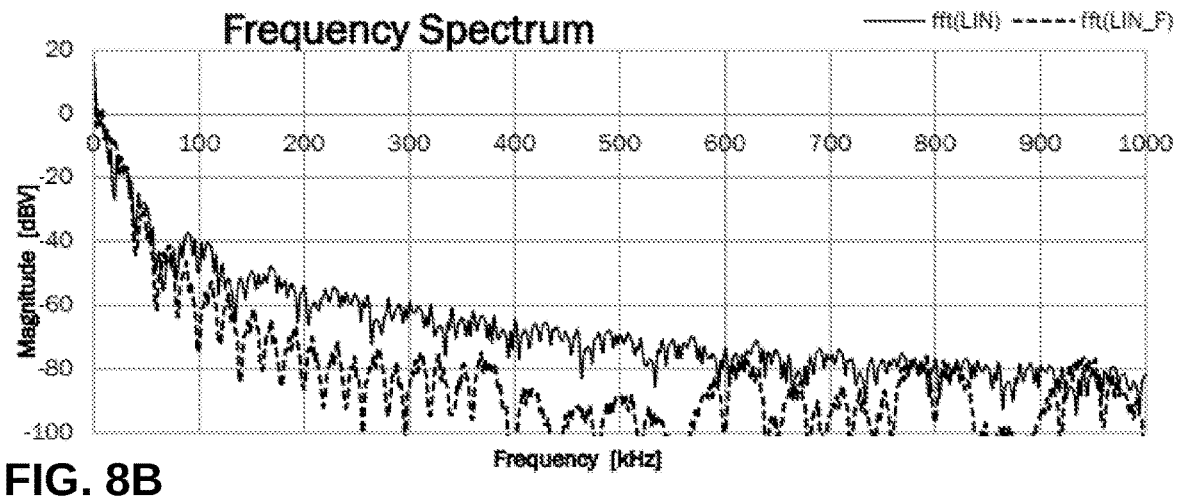
FIG. 8B is a graph comparing spectra of illustrative fast-data and conventional LIN signals.

FIG. 8A compares a sinusoidal-pulse-shaped transmit signal at 40 kHz baud rate to a conventional LIN bus signal at a 20 kHz baud rate, and FIG. 8B shows the power spectral density of each. With suitable pulse shaping, the spectral energy of the fast-data signal above its baud rate can be kept at or below that of the conventional LIN bus signal. Accordingly, the bus slave transceivers can employ pulse shaping to double the response message baud rate while maintaining compliance with the specifications for electromagnetic emissions.

FIG. 7 shows an illustrative frame format for the LIN bus. In accordance with the LIN bus specification, each LIN bus transaction begins with the bus master sending a frame header 702. The frame header includes a break field (driving the I/O line low for at least 13 bit intervals followed by a return to high for at least one bit interval), a sync byte field (a start bit followed by a byte of alternating bits and a stop bit), and an identifier field (a start bit, a six-bit frame identifier followed by two parity bits, and a stop bit). In response to the frame header 702, one of the bus slave transceivers (as determined by the frame identifier) sends a frame response 704. Pursuant to the standard, the frame response 704 is sent at the same baud rate as the frame header and includes one to eight bytes of data followed by a checksum byte. Each byte in the response 704 is preceded by a low (zero) start bit and followed by a high (one) stop bit.

To accommodate the volume of data created by, e.g., four sensors each providing up to 20 echo magnitudes and times of arrival approximately every 40 milliseconds, at least some contemplated embodiments provide fast-data frame responses to the frame header. The fast-data frame responses are not limited to just eight bytes of data, but rather can provide an increased maximum number of data bytes. Depending on the bus and sensor configuration, the maximum number of data bytes in a fast-data frame response may be 16, 20, 32, 40, 50, 64, 100, or some other suitable value. Moreover, the data-bytes in each frame may be followed by a one-byte checksum, a two-byte cyclic redundancy check, or some other form of information that enables error detection. As mentioned previously, alternative sensor embodiments may provide digital samples of the "raw" receive signal in a compressed form that enables the echo detection to be performed by the ECU, similarly requiring substantially elevated levels of data to be conveyed across the bus.

Further, where the bus slave transceivers employ pulse shaping, the fast-response frame responses may be sent at higher baud rates than the frame header, e.g., at twice (or even three-times) the baud rate of the frame header. Thus, if the header is sent at 20 kHz, the response may be sent at 40 kHz or more. Some contemplated embodiments use even higher baud rates (e.g., 60 kHz) for the fast-data frame responses.

Figure 9:
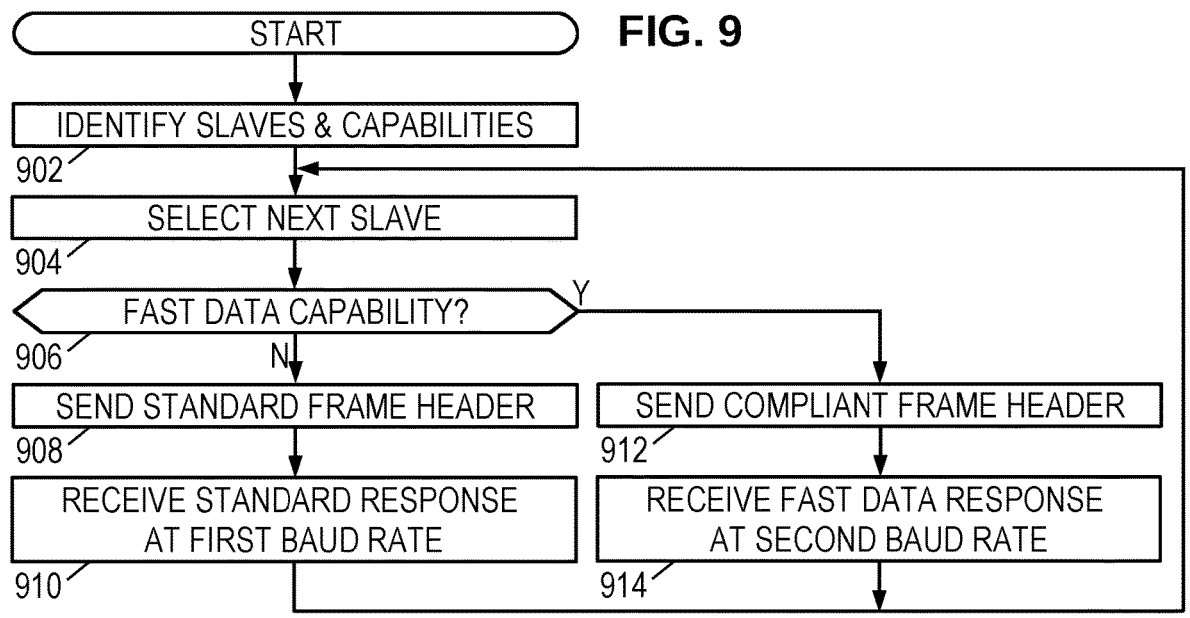
FIG. 9 is a flow diagram for an illustrative LIN compliant fast-data communication method.

FIG. 9 is a flow diagram for an illustrative LIN compliant fast-data communication method. In block 902, the bus master polls the bus slaves to identify the slave devices and their capabilities. It is envisioned that the fast-data transceivers will be able to co-exist on the same bus as existing transceivers that comply with the LIN standard. Having identified the slaves, the bus master communicates that information to the ECU, enabling the ECU to begin systematically iterating through each of the bus slaves to communicate with each, returning to the first after querying the last in the list. In block 904, the ECU selects which slave device to query, and in block 906 the ECU checks to see whether the selected slave device supports fast-data responses. If not, the ECU queries the selected slave (via the bus master) in block 908, sending a standard frame header with an identifier for the selected slave and desired information. The header is sent at a first baud rate, e.g., 20 kHz. In block 910, the bus master receives the frame response from the selected slave, also at the first baud rate and with the 8-byte limitation, and communicates the information to the ECU.

Otherwise, if the selected slave device supports fast-data responses, the ECU (via the bus master) in block 912, queries the selected slave with a LIN compliant frame header at the first baud rate. However, the identifier used in the frame header indicates to the selected slave device that a fast-data response is desired. In block 914, the bus master receives the fast-data response having a larger payload (e.g., 32 bytes) and potentially having a second, larger baud rate (e.g., 40 kHz) from the selected slave device. When a larger baud rate is used, the selected slave device provides pulse shaping to keep the fast-data signal emissions in compliance with the applicable standards.

Note that to receive at the higher data rate, it may be necessary for the ECU to set the bus master (or in the case of FIG. 5, the bus bridge UART) to operate at the higher baud rate for at least the period where a fast-data response might be expected. Though the existing hardware is expected to support the higher baud rates, the ECU's firmware may need to be updated to switch the UART's baud rate as needed. If the firmware or ECU doesn't support the fast-data response feature, the sensors may be configured to emulate the operation of a standard LIN bus slave transceiver and otherwise operate as a legacy sensor.

Though the operations shown and described in FIG. 9 are treated as being sequential for explanatory purposes, in practice the method may be carried out by multiple integrated circuit components operating concurrently and perhaps even speculatively to enable out-of-order operations. The sequential discussion is not meant to be limiting. Moreover, the focus of the foregoing discussions has been ultrasonic sensors, but the principles are applicable to any LIN bus slave devices that may benefit from sending at higher data rates. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An extended local interconnect network (LIN) bus communication method for a slave LIN bus transceiver, the method comprising:
   receiving a first LIN frame header at a first baud rate on a serial bus line, the first LIN frame header having a frame identifier for a fast-data frame; and
   sending a fast-data response message at a second baud rate on the serial bus line, the second baud rate being larger than the first baud rate.

2. The method of claim 1, further comprising:
   receiving a second LIN frame header on the serial bus line, the second LIN frame header having a frame identifier for a standard LIN frame; and
   sending a standard LIN response message at the first baud rate on the serial bus line, the standard LIN response message having at most eight data bytes and a one-byte checksum.

3. The method of claim 2, wherein the fast-data response message has more than eight data bytes.

4. The method of claim 3, wherein each data byte of the fast-data response message and of the standard LIN response message is preceded by a start bit and followed by a stop bit.

5. The method of claim 3, wherein the fast-data response message has at least twenty data bytes.

6. The method of claim 1, wherein said sending includes using pulse shaping to limit spectral energy above the second baud rate.

7. The method of claim 6, wherein the pulse shaping is sinusoidal pulse shaping.

8. The method of claim 7, wherein the first LIN frame header has a characteristic spectrum that, at any frequency above the second baud rate, exceeds or approximately equals the spectral energy of the fast-data response message.

9. The method of claim 1, wherein the first baud rate is 20 kHz and the second baud rate is at least 40 kHz.

10. An extended LIN bus communication method for a master LIN bus transceiver, the method comprising:
    sending a first LIN frame header at a first baud rate on a serial bus line, the first LIN frame header having a frame identifier for a fast-data frame; and
    receiving a fast-data response message at a second baud rate on the serial bus line, the second baud rate being larger than the first baud rate.

11. The method of claim 10, wherein said sending includes setting a universal asynchronous receiver/transmitter (UART) to the first baud rate, and wherein said receiving includes setting the UART to the second baud rate.

12. The method of claim 10, further comprising:
    sending a second LIN frame header on the serial bus line, the second LIN frame header having a frame identifier for a standard LIN frame; and
    receiving a standard LIN response message at the first baud rate on the serial bus line, the standard LIN response message having at most eight data bytes and a one-byte checksum.

13. The method of claim 12, wherein the fast-data response message has more than eight data bytes.

14. The method of claim 13, wherein each data byte of the fast-data response message and of the standard LIN response message is preceded by a start bit and followed by a stop bit.

15. The method of claim 10, wherein the first baud rate is 20 kHz and the second baud rate is at least 40 kHz.

16. A slave LIN bus transceiver that comprises:
- a comparator that detects amplitude modulation of a bias voltage at a first baud rate on a serial bus line to receive a first LIN frame header having a frame identifier for a fast-data frame; and
- a digital-to-analog converter (DAC) that responsively drives a fast-data response message having more than eight data bytes.

17. The transceiver of claim 16, wherein the DAC drives the fast-data response message at a second baud rate on the serial bus line, the second baud rate being larger than the first baud rate.

18. The transceiver of claim 17, wherein the DAC applies pulse shaping to bits of the fast-data response message to limit spectral energy above the second baud rate.

19. The transceiver of claim 17, wherein the comparator receives a second LIN frame header on the serial bus line, the second LIN frame header having a frame identifier for a standard LIN frame, and wherein the DAC responsively drives a standard LIN response message at the first baud rate on the serial bus line, the standard LIN response message having at most eight data bytes and a one-byte checksum.

20. The transceiver of claim 16, wherein each data byte of the fast-data response message and of the standard LIN response message is preceded by a start bit and followed by a stop bit.

* * * * *